April 30, 1968 R. J. JASPER ETAL 3,380,223
COUNTER ROLL FINISHING SYSTEM
Filed Oct. 23, 1965 7 Sheets-Sheet 1

RONALD J. JASPER
GEORGE W. GUSTAFSON
INVENTORS

BY

ATTORNEYS

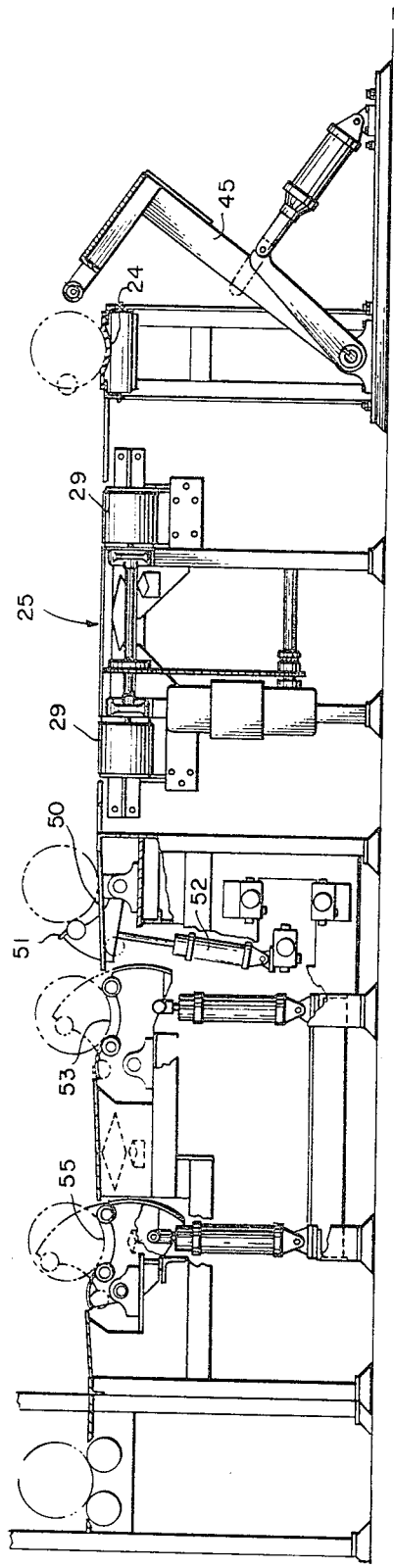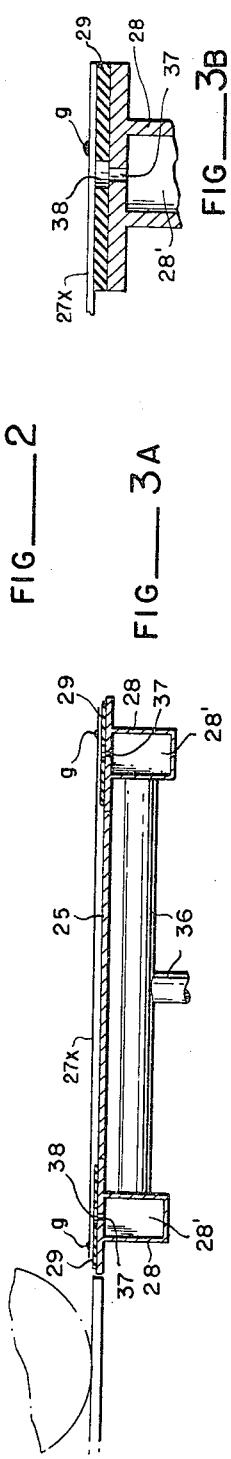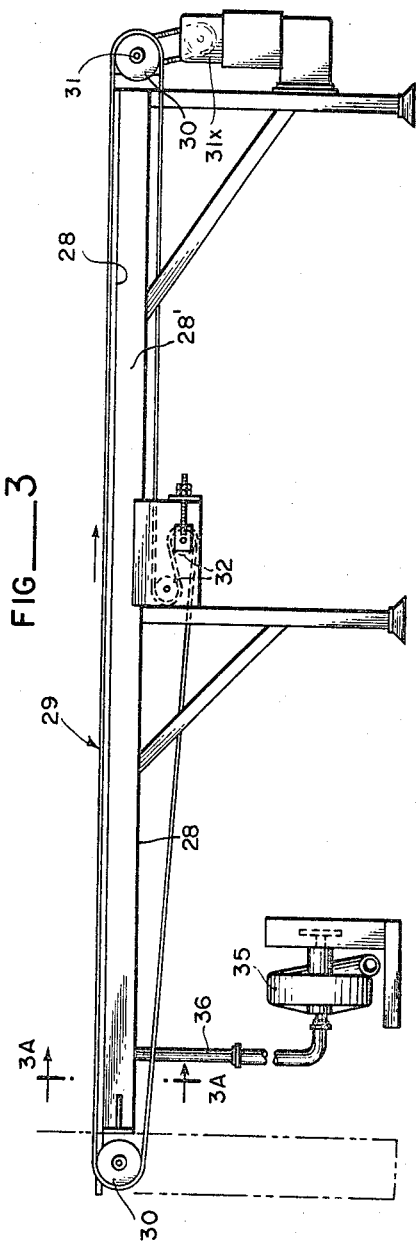
FIG—2
FIG—3A
FIG—3B
FIG—3
RONALD J. JASPER
GEORGE W. GUSTAFSON
INVENTORS
BY
ATTORNEYS

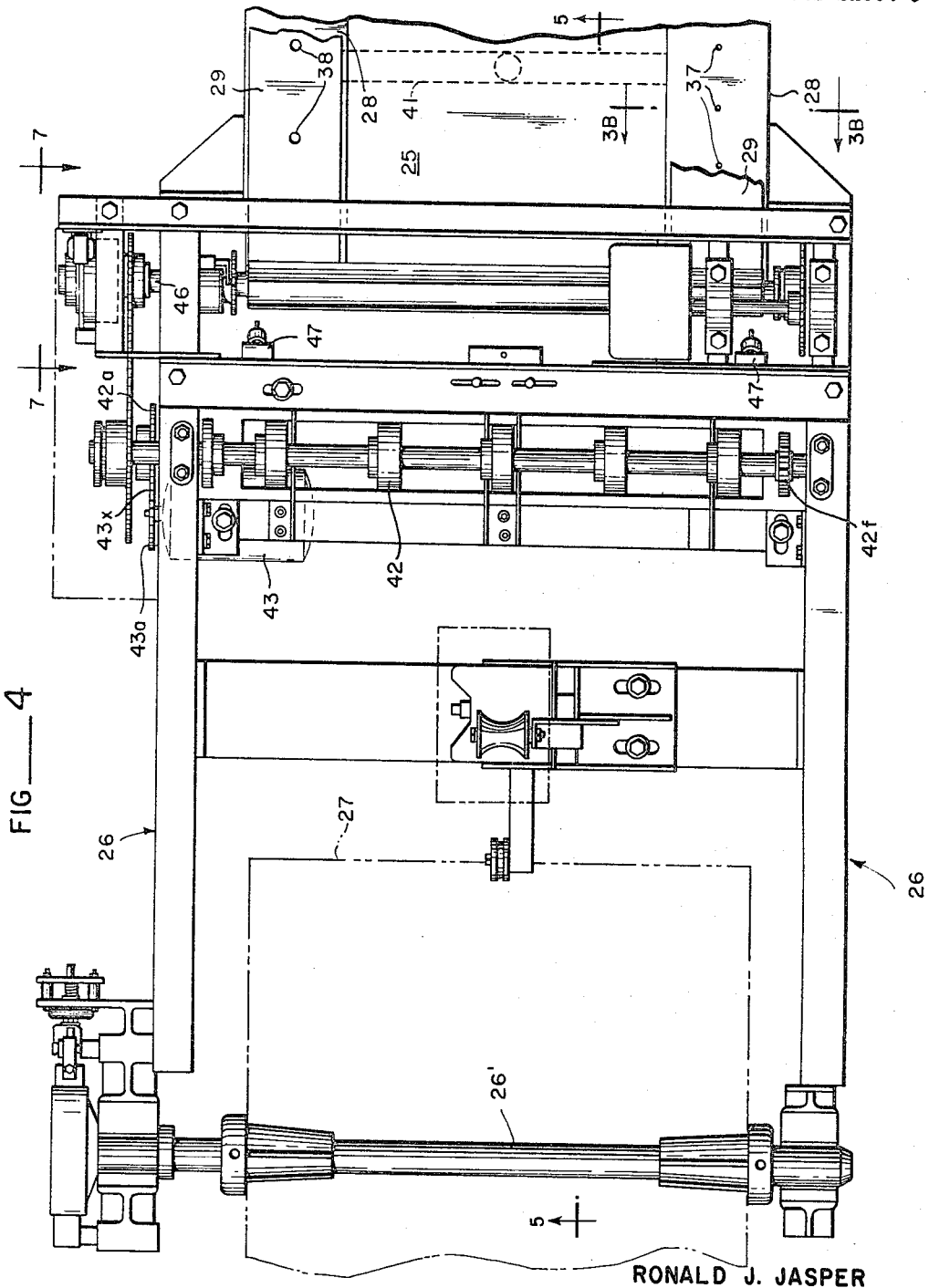

April 30, 1968  R. J. JASPER ETAL  3,380,223
COUNTER ROLL FINISHING SYSTEM
Filed Oct. 23, 1965  7 Sheets-Sheet 4
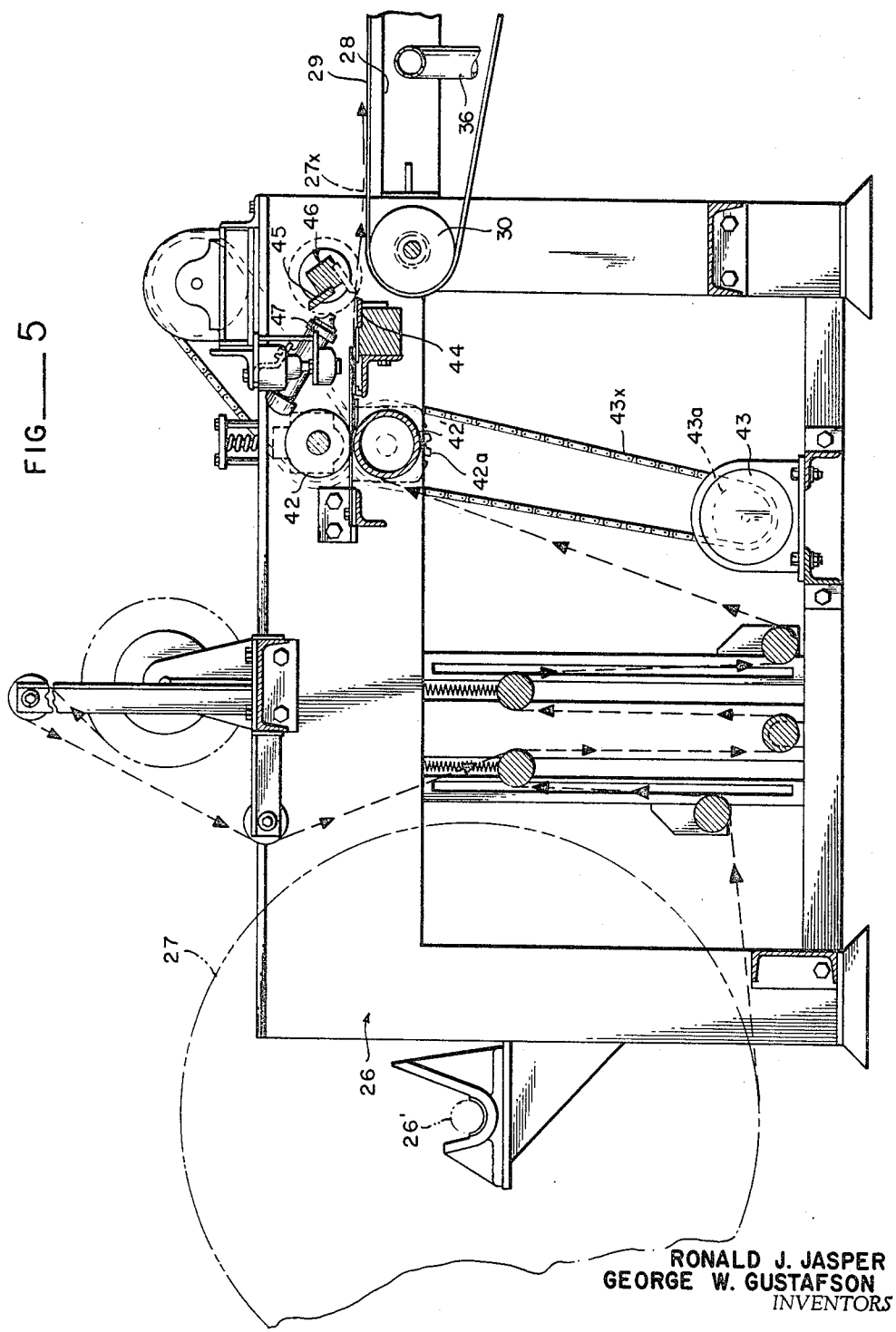
RONALD J. JASPER
GEORGE W. GUSTAFSON
INVENTORS
BY Seed & Berry
ATTORNEYS April 30, 1968  R. J. JASPER ET AL  3,380,223
COUNTER ROLL FINISHING SYSTEM
Filed Oct. 23, 1965  7 Sheets-Sheet 5
FIG__6
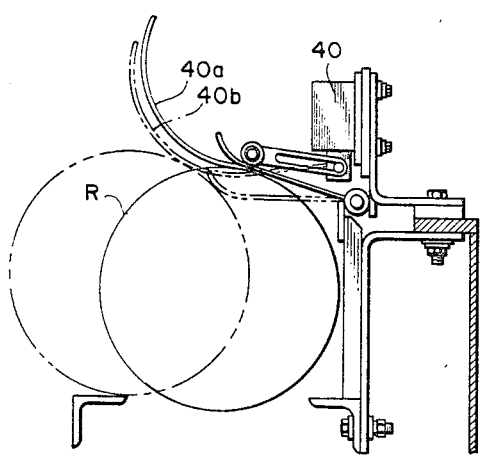
FIG__7
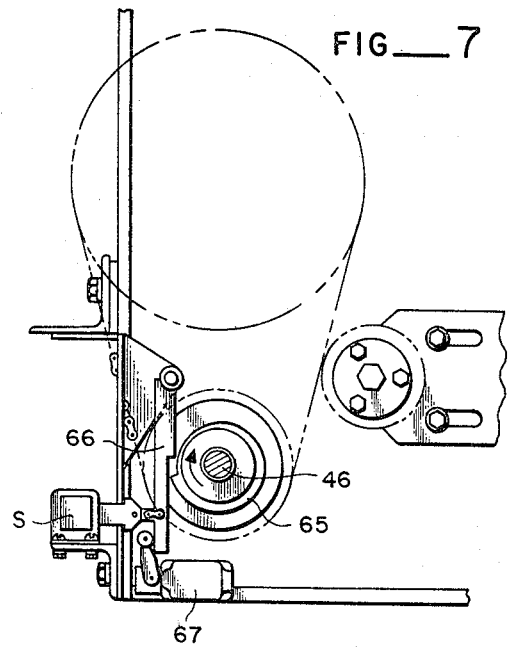
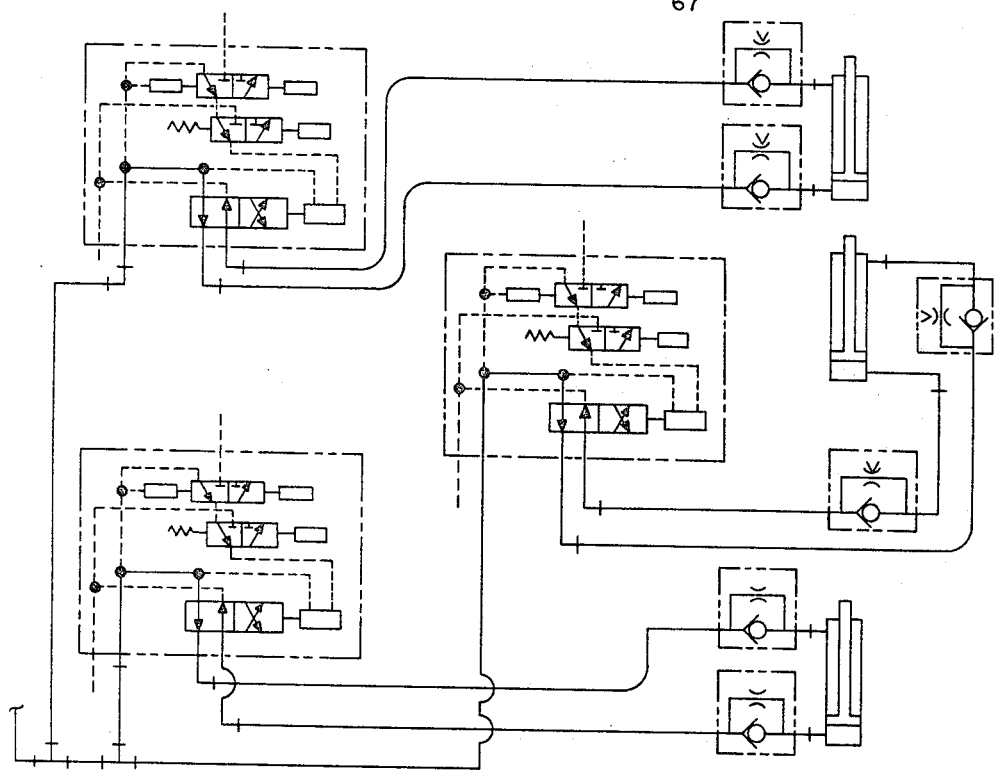
FIG__8
INVENTORS
RONALD J. JASPER
GEORGE W. GUSTAFSON
BY
*Seed & Berry*
ATTORNEYS

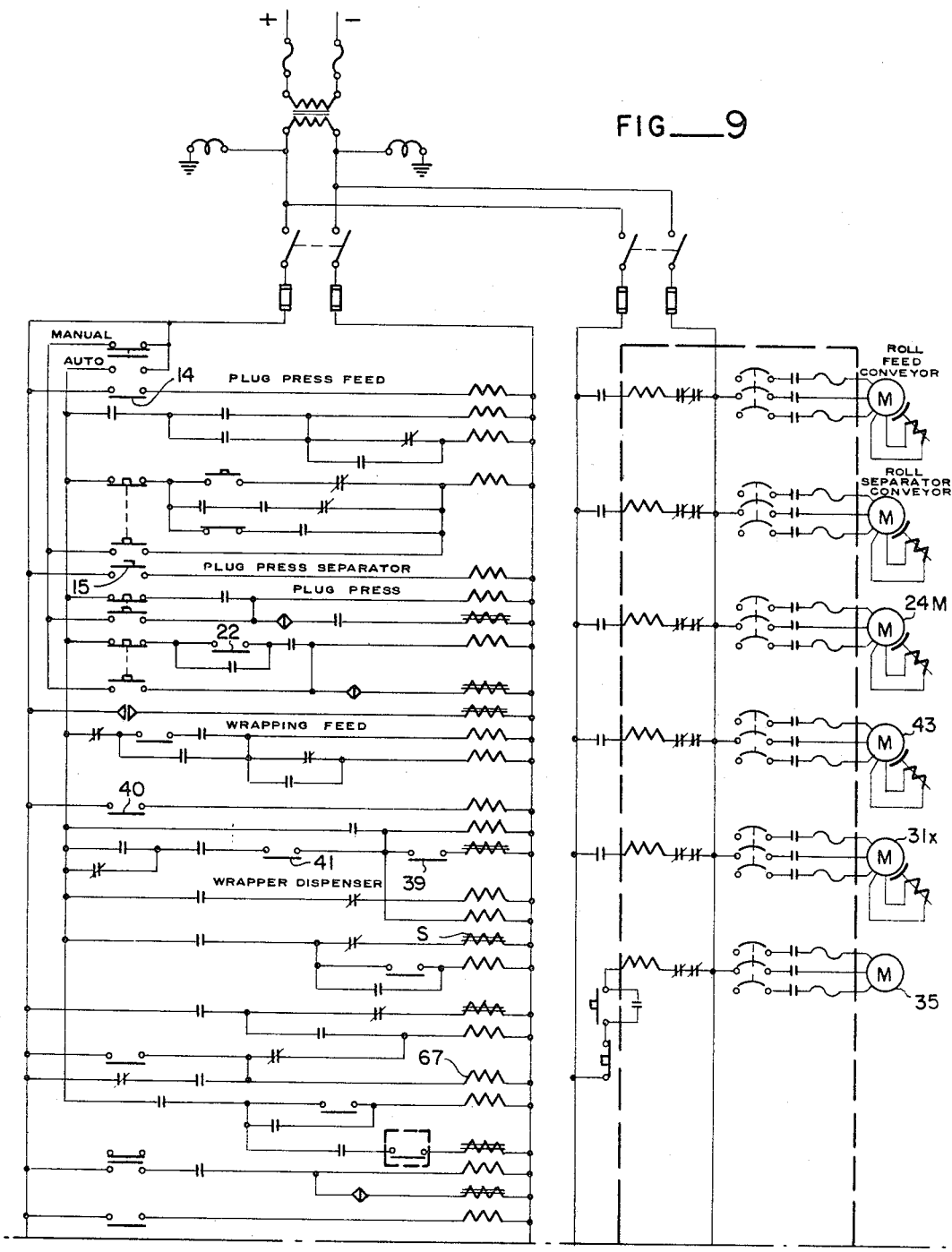

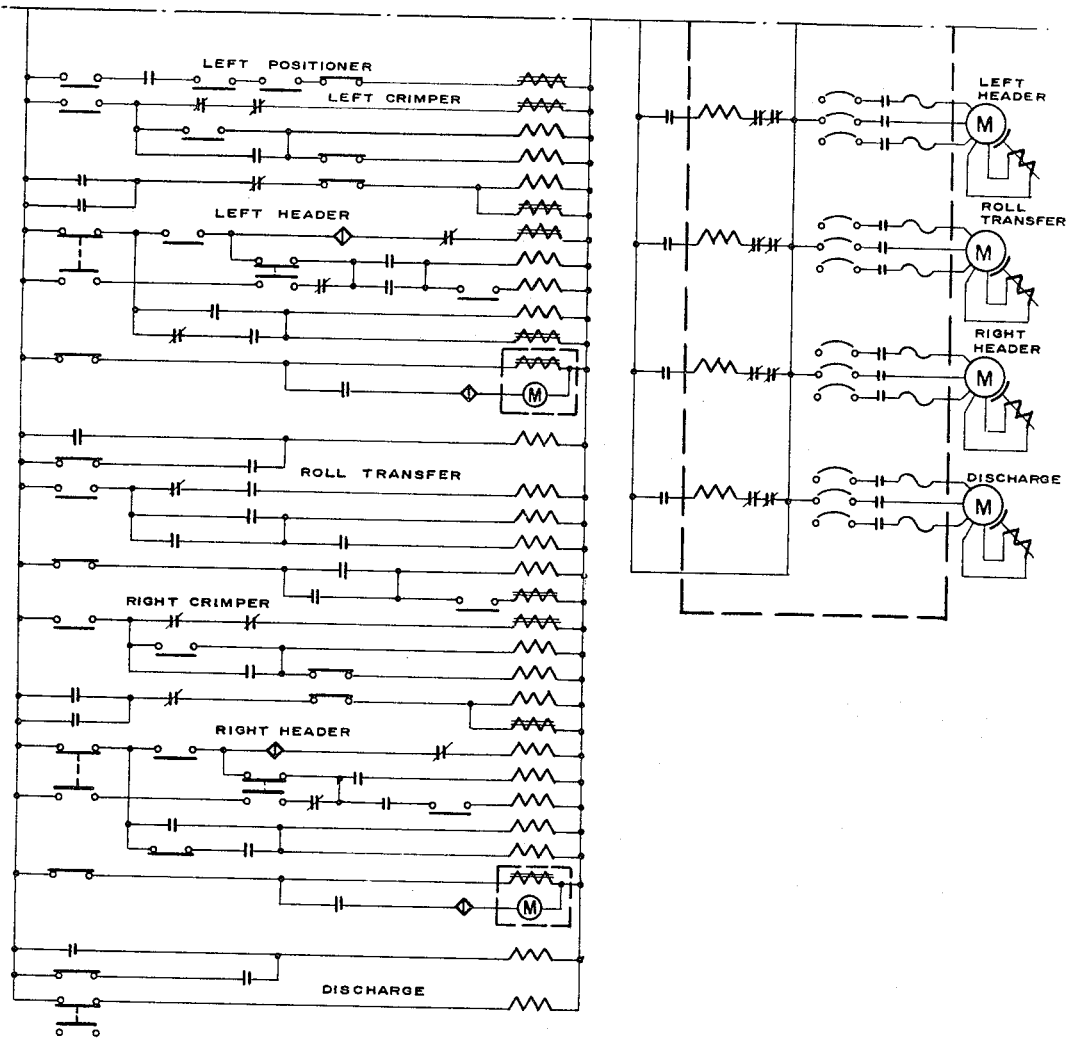
FIG. 10
RONALD J. JASPER
GEORGE W. GUSTAFSON
INVENTOR.
BY
ATTORNEYS United States Patent Office 3,380,223
Patented Apr. 30, 1968

3,380,223
COUNTER ROLL FINISHING SYSTEM
Ronald J. Jasper and George W. Gustafson, Hoquiam, Washington, assignors to Lambs-Grays Harbor Co., Inc., Hoquiam, Wash.
Filed Oct. 23, 1965, Ser. No. 503,506
8 Claims. (Cl. 53—66)

This invention relates to what is herein designated as a "Counter Roll Finishing System," that is, it pertains to a new and novel system of sequential operations as performed by cooperatively associated devices in the complete finishing of counter rolls for their delivery into trade, and for their use in stores and establishments of various kinds where the wrapping of articles or objects as dispensed to customers is a usual or necessary procedure.

For proper understanding of the present invention, it will here be explained that the present designation "counter rolls" applies to those rolls of wrapping paper ordinarily placed for use on the counters of grocery, hardware and dry goods stores, as well as in meat markets and other establishments. Such rolls are prepared and sold into trade in various or random lengths but, regardless of length, all counter rolls produced are of a substantially standardized diameter of approximately nine inches. Each roll as produced comprises a continuous strip of paper, which as wound or rolled, is formed with an end to end tubular core passage of relatively small diameter into the opposite ends of which core tapered wooden, metal or other type plugs are later pressed for roll mounting; this plugging being an initial item of the present "finishing" operation.

The present "system" is designated to perform all of the necessary individual operations required for the complete finishing of counter rolls to make them ready for delivery into trade; such as, for example, the above mentioned operation of plug insertion and seating; the cutting and applying of a protective body wrapper of paper about the roll; the crimping of the projecting ends of the applied wrapper against the roll ends; applying of the opposite end heads to the rolls over the end crimps of the wrapper and finally conveying the finished rolls to a place of storage or place of use.

It is the principal object of this invention to provide a system of and devices operable in sequence for carrying out the above mentioned and other required roll finishing operations in a practical expeditious and economical manner.

A further object of the invention resides in that particular novel relationship of devices and novel manner or mode of their control and use for the dispensing of a strip of body wrapping paper of required length, from a source of supply, in accordance with the random length requirement of any roll that is advanced to a position for wrapping and then cause the roll to be wrapped therein. Also, in the wrapper dispensing operation, taking into consideration and providing for that extra length of wrapper strip at each end of the roll required for crimping of the extended end portions against the end surfaces of the wrapped roll and finally the application of end heads over the crimped ends of the wrapper.

Further objects of the present invention will be made known and explained as this specification progresses.

In accomplishing the above mentioned and other objects of the invention, I have provided the improved details of construction and the mode of operation of various devices that are employed for carrying out the present system, as hereinafter described and illustrated in the accompanying drawings, wherein:

FIG. 2 is an enlarged cross-section of certain parts of the system taken on the transverse line 2—2 in FIG. 1.

FIG. 3 is an enlarged elevational and sectional view showing the roll wrapping table as seen on line 3—3 in FIG. 1.

FIG. 3A is a sectional detail of the wrapping table taken on line 3A—3A in FIG. 3.

FIG. 3B is an enlarged vertical section on line 3B—3B in FIG. 4 through one of the vacuum tables embodied with the wrapping table.

FIG. 4 is an enlarged top or plan view of the roll wrapper dispensing and wrapper strip cut-off means, as seen in FIG. 1.

FIG. 5 is a vertical section, taken on line 5—5 in FIG. 4.

FIG. 6 is an enlarged view of a switch and its acutator detail, taken on line 6—6 in FIG. 1.

FIG. 7 is an enlarged showing of parts of the fly knife controls looking through the vertical plane of line 7—7 in FIG. 4.

FIG. 8 is a schematic diagram of the pneumatic system of the cooperatively associated devices of this roll finishing system.

FIGS. 9 and 10 are schematic layouts of the wiring diagram for the system.

Figure 1:
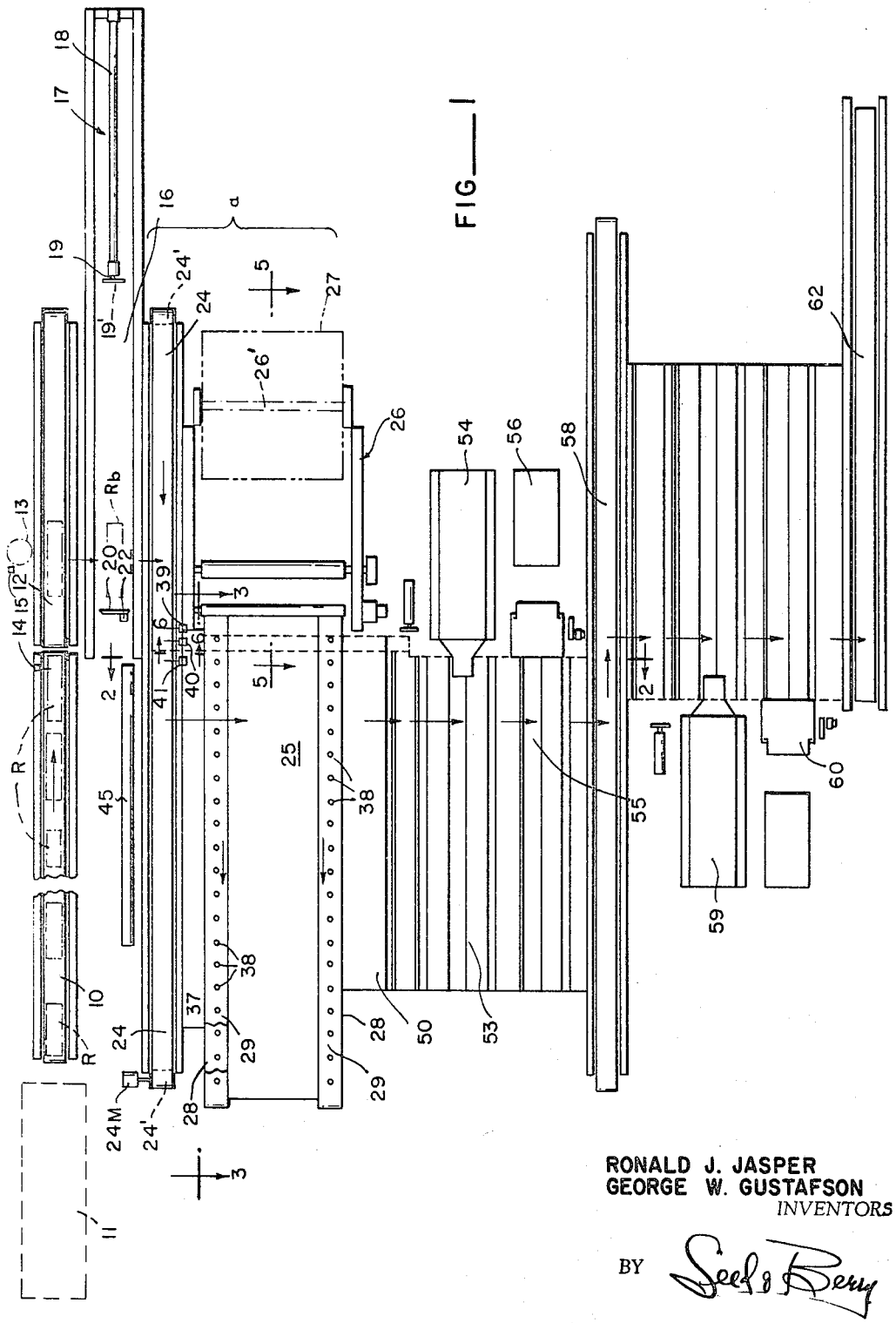
FIG. 1 is a plan or lay-out, showing the presently preferred assembly of roll conveyors and associated devices or mechanisms employed in the carrying out of the present counter roll finishing system.

The present counter roll finishing system embodies, as one of its characterizing features, the necessary equipment for processing rolls of various or random lengths as delivered thereto in variously spaced sequence. Also, this system embodies the use of mechanisms for each function which is an entity in itself and wherein each mechanism forms a basic module, which may be selected for use and cooperatively arranged to suit the requirements of any particular installation.

The system, as herein illustrated, also embodies three basic sub-systems: The first being a counter roll feed or conveyor system which includes all necessary driving equipment and controls for handling paper rolls from a point of production to the wrapping system and may also include counter roll stripping conveyors, roll breakers, conveying equipment and a plug press.

The second sub-system, beyond the plug press, embodies the counter roll wrapper and wrapping mechanisms that include means that effect the measuring off and application of a body wrapper to each roll as advanced to the wrapping tables, means for crimping the extending end portions of the wrapper after its rolled application to and securement about a roll, and finally the means for applying the end heads over the end crimps of the wrapper as well as final labeling and marking of the wrapped rolls if desired.

Referring more in detail to the drawings:

In the plan view of layout of the system, as shown in FIG. 1, 10 designates a continuous horizontally traveling conveyor belt on which counter rolls R, which may be of random lengths, are received and advanced endwise in spaced succession from a point of production here designated at 11, to the discharge end of the conveyor belt 10. In alignment with the belt 10, is a continuing conveyor belt 12, designated to receive the rolls R endwise thereon when caused to be advanced from belt 10. The means for supporting and driving the belts 10 and 12 may be conventional and the driving means as provided therefor, are independent of each other and have separate driving controls as presently explained.

Adjacent the belt 12, which is herein known as the roll separator belt and at one side thereof is an attendant's work station which in FIG. 1 is designated by the dash line circle 13. At one side of the belt 10, near its discharge end, is a switch 14 which operates, as each successive roll R nears the roll discharge end of belt 10. Also, at a point readily accessible to the operator and located adjacent station 13 is a switch 15, which the operator may actuate, when he desires, to thus re-establish the driving connections of belt 10 to advance the foremost roll R endwise therefrom onto belt 12. When a roll R is thus advanced onto belt 12, it moves thereon toward the operator's station 13, and another roll R will be moved to discharge position on belt 10 and will cause the switch 14 to again operate to stop the conveyor 10. With the advancing of each roll R, as delivered by belt 12 to a position readily accessible to the operator at station 13, he releases the switch 15, and thereby stops the conveyor 12 and advanced roll R. He then manually inserts the usual plugs into the opposite ends of the open axial core of the stopped roll and then rolls or pushes the plugged roll laterally from belt 12 onto the adjacent base, cradle or bed portion 16 of a powered plug seating press 17 that is shown in FIG. 1. The hand plugged roll will come to rest in that position in which it is represented in dash lines at R$b$ in FIG. 1.

The plug press 17 comprises an elongated power cylinder 18 preferably horizontally mounted on bed 16 and equipped with an extended piston rod equipped with a disk-like head 19' at its outer end. Also, fixed to the bed 16 at that end opposite the cylinder 18 and in alignment with the piston rod 19, is a fixed roll abutment or stop 20. In the plug applying operation, after the roll R has been pushed by the operator, to the position designated in FIG. 1 at R$b$, it is held between guides in alignment with and between the abutment 20 and the piston head 19'.

When the operator again actuates switch 15 to re-start the conveyor belt 10, to advance the next roll R as carried on this conveyor onto the belt 12, this switch 15 also operates a conventional valve means not shown to admit pressure medium to the cylinder 18, as presently explained, thereby causing it to extend its piston rod 19 and move the piston head 19' firmly against the adjacent end of the roll designated at R$b$ to push that roll endwise and firmly against the abutment 20 thus to cause the complete and firm seating of the plugs in the roll core ends. When the plug press piston rod moves into its fully extended plug seating position, it will then cause the roll as abutted against the roll stop 20 to actuate a time delay switch 22 that is mounted as in FIG. 1 on the abutment 20. This switch 22 first energizes means to release the pressure medium from the cylinder 18 and cause retraction of the press piston rod 19 and then, after expiration of a time delay period allowed by the switch 22, to energize power means not shown whereby to tilt the bed 16 of the press 17 laterally thus to effect a lateral rolling discharge of the plugged roll R therefrom to the wrapper feed section; this being that elongated section of the mechanism seen in the FIG. 1 layout, and spanned at one end by the bracket 2$a$; the several parts of which section are shown immediately below and along the line of the roll discharge side of the bed 16 of the plug press 17, as shown in FIG. 1.

The bracketed roll wrapping feed section comprises a rather elongated horizontal conveyor belt 24 which receives the rolls R directly and lengthwise thereon as discharged from the plug press bed 16. This conveyor belt 24 is continuous and it extends substantially the full length of the wrapping section as herein shown, about belt driving wheels 24' at its opposite ends; these being driven by a motor shown at 24M in FIG. 1. Each roll R, as received from the plug press 17 and as disposed lengthwise on the belt is conveyed along the near side edge of the horizontal top surface of a wrapping table top 25 and ultimately is laterally displaced from the conveyor belt 24 and caused to roll directly onto and across the table top 25 into which a measured length of roll wrapping material such as paper will have been disposed coincident with travel along table 25, of each roll R on belt 24, as will presently be explained.

The assembly of devices and mechanisms embodied in the wrapper strip dispensing device for the roll wrapping operation and subsequent cutting and securement of the measured wrapper are best shown in plan view in FIG. 1 and are seen in enlargement in FIGS. 2, 4 and 5 in which the belt 24 and table 25 are seen to be in rather close parallel relationship.

At the right hand end of the table 25, as shown in FIG. 1, is a roll supporting stand 26 including a cross-axle 26' shown at the left hand end of FIG. 5, on which a supply roll 27 of wrapping paper is rotatably mounted. It is also shown in FIGS. 3, 3A and 4 that at each of the opposite side edges of table top 25 and coextensive therewith are elongated narrow hollow vacuum tables 28—28 chambered as at 28' to their full lengths and disposed at the same level as the top of table 25, as best shown in FIG. 3A.

Extending along each of the chambered tables 28—28 to their full lengths are continuous wrapper pick-up belts 29—29, each mounted for travel at its opposite ends about belt carrying wheels 30—30, those wheels 30 that carry the discharge ends of these belts are mounted by a driving cross shaft 31 extended horizontally across the frame of the stand as seen in FIG. 3 which has a driving connection with a power source 31$x$ shown in that figure.

Each belt 29 has its top run mounted flatly on and for sliding travel and support on the top surface of the corresponding table 28 and its bottom run extending along and below the bottom wall of the table and about adjustably mounted belt tightening rolls 32, as shown in FIG. 3. The travel of these two belts is in unison and in the direction indicated by the arrows placed thereon in FIG. 1.

A desired degree of vacuum is maintained in each of the hollow tables 28—28 by means of a vacuum pump designated as 35 in FIG. 3, which has pipe connections 36 with both chambered tables.

The top wall of each of the tables 28 is formed to its full length of the chamber 28' thereof, with a row of small, closely spaced apertures 37 and each belt 29 is formed with a longitudinal row of spaced apertures 38 of somewhat larger diameter, positioned for travel in coincidence with the line of apertures 37 in the corresponding belt supporting table top as in FIG. 3A. The wrapper strip 27$x$ extends from the supply roll 27 over a plurality of strip tensioning rolls to pass between coacting draw or feed rolls 42–42' rotatably supported across frame 26. The driving connection for the draw rolls comprises a motor 43, a sprocket chain belt 43$x$ that operates about a sprocket wheel 43$a$ on the motor shaft and a sprocket wheel 42$a$ fixed on one end of the mounting shaft of roll 42'. The two draw rolls are geared to rotate in unison in opposite directions through a geared connection shown at 42$f$ in FIG. 4 adjacent the lower edge of the view.

From the draw rolls 42–42' the wrapper strip 27$x$ is fed forwardly across a knife bar 44 that is fixed across the frame 26. A fly blade 45 mounted by a mandrel 46 coacts with the knife 44 (see FIG. 5) to cut the end of the advancing wrapper free from the supply for its continued advancement by the belts 29—29 along the table 25. Normally the blade 44 and fly blade 45 are at rest and in such spaced relationship that the advancing end of the wrapper strip 27 feeds freely between them and is sheared off only incident to the energization of the cutter mandrel 46 for one rotation as later explained. The length of the wrapper dispensed is established by the length of each entering roll. This is because the wrapper dispenser is started with the entering of each roll R and is stopped incident to the switch arm 40A dropping from the trailing end of the roll. This operation, similarly, measures a length of wrapper for each roll regardless of roll length. In view of the fact that the length of wrapper cut free from the supply roll is determined by switch 40, and because it is cut free while its trailing end is still within the confines of the frame 26, it is desirable that the belts 29 shall continue their travel to clear the measured length of wrapper from the dispenser. Their continued operation is maintained by means of switch 67 shown in FIG. 7, which is so disposed that when the trailing end of the advancing roll has cleared switch arm 40a and the draw rolls have stopped, the pickup belts will still continue to advance the strip 27x fully onto table 25. Also, the conveyor belt will continue to travel to keep the roll R in proper relationship to the dispensed wrapper.

With the starting of the wrapper draw rolls 42–42' and the advancing of the wrapper strip 27x onto table 25, with its opposite side edge portions overlapping with the wrapper feed belts 29—29, to which it is held by suction applied through the belt apertures, the two glue dispensers 47—47, are energized by switch 39 to discharge strips or bands of a suitable adhesive longitudinally onto top opposite side edge portions of the advancing wrapper strip 27x as has been indicated in FIG. 3A by reference letters g—g. The travel of the conveyor belt 24 is in synchronism with the advancement of the wrapper strip by belts 29—29.

Before further describing the controls for the above described parts, it will be explained that the transverse width of the advanced wrapper strip 27x is sufficient to wrap completely about the roll. When the trailing end of the advancing roll R clears the arm of switch 40, that switch acts to effect energization of the cutter head 46 to make one rotation and to cut the dispensed length of wrapping strip 27x free from the supply roll 27 and simultaneously stops the wrapper feeding means as effected by motor 43.

The advancing counter roll, after clearing the switch arms of both switches 39 and 40, moves against and actuates a third switch 41 to stop the conveyor belt 24 and the paired belts 29—29. Switch 41 also energizes a kicker bar 45. With the stopping of the conveyor belt 24 and belts 29—29 which advance the roll wrapper strip on table 25, a kicker bar 45 which is mounted along that side of the belt 24 as shown in FIG. 1 and 2 to actuate it in such manner against the roll R as to cause the latter to be rolled directly onto and across the top of the table 25, and in doing this is caused to be rolled across the then stationary wrapper strip 27x which had been cut free and advanced to position. Thus, in its rolling across the table 25, the roll first picks up the near longitudinal glued edge of the wrapper and in its continuing travel, rolls the adhering wrapper about it and finally causes the far edge of the wrapper to be engaged by and to adhere to the wrapped roll and the roll to be received on a transfer table or plate 50.

A special feature of the present mechanism is found in the draw roll operation that adds additional length to the ends of dispensed wrappers for the forming of end crimps; the added length of wrapper being 3½ inches at each end.

In view of the fact that each roll R as moved along the table actuates the switch 40 to start and stop the draw rolls to draw out a wrapper exactly equal to the length of the roll R, applicants have provided for gaining the additional length of wrapper required for end crimping in the following manner through the rotation of the fly knife mandrel as will now be described.

At one end of the lower draw roll 42' is the sprocket wheel over which the chain belt 43x driven by motor 43 operates to drive the rolls. Also, a shouldered stop clutch cam 65 of disk-like form, see FIG. 7, is fixed on the mandrel 46 for engagement by a shouldered stop bar 66 that is pivoted in the frame 26 in position to engage with the shouldered cam and normally hold the mandrel 46 against rotation after a cut has been made and thus to stop the fly knife at a normal 12 o'clock position. When the dispensed wrapper strip 27x has advanced to the proper length across blade 44 as determined by the travel of the roll R that is to receive it, and the draw rolls 42–42' have stopped, the stop bar 66 is then pulled free of the cam shoulder by a controlling solenoid S and the mandrel 46 is driven through one complete turn, to cause the blade 45 to coact with blade 44 to sever the wrapper strip. The bar 56 is then returned and the fly blade is stopped thereby after one revolution to its 12 o'clock position.

Upon its being wrapped and discharged laterally from table 25, the wrapped roll is received on the transfer plate and rolls against a hinged stop 51, as indicated in FIG. 2. This stop is subsequently released by an air cylinder 52 for rolling into a crimper station 53 where that portion of the roll wrapper extended beyond the right hand end of the roll is caused to be crimped against that end surface of the roll by a crimper device 54 seen in FIG. 1. From the crimper 54 the roll is laterally discharged to roll to a troughed support 55 for the application of an end head over that crimped end of the roll by a heading device 56. The roll, crimped and headed at one end, is then advanced onto a conveyor belt 58 that returns the roll to a position for its lateral rolling travel to a second crimper 59 and heading means 60 which operate in the same manner as those just described, to crimp and head the left hand end of the advanced roll. Finally the wrapped, crimped and headed roll is discharged onto a conveyor 62 for conveyance to a storage area or to place of use.

What we claim to be new is:

1. A counter roll finishing system comprising in combination; infeed conveyor means, plug press means for seating core plugs in opposite ends of each roll advanced thereto from the infeed conveyor, a wrapping table, transfer conveyor means operable between said table and said press for receiving a plugged roll and advancing the same adjacent said table, wrapper dispenser means for dispensing a wrapper strip onto said table at the rate of conveyor advancement of the roll, wrapper cut-off mechanism actuated by counter roll advancement to cut off a wrapper strip of corresponding length, means for discharging the roll across the table causing the wrapper strip to be rolled thereabout, first and second crimper means for crimping the respective ends of the wrapper, and first and second header means for applying an end head to the respective crimped ends of the wrapper.

2. The counter roll finishing system according to claim 1 wherein said infeed conveyor means comprises; a first conveyor belt for advancing rolls, from a production unit, a separator conveyor in line with said first conveyor and adapted to receive rolls therefrom and to convey the same to a position adjacent said plug press, first switch means operable responsive to advancement of each roll to the end of the first conveyor to deenergize said first conveyor, manually operable switch means for selectively energizing said first conveyor and said separator conveyor and deenergizing said separator conveyor when the roll is in position adjacent the plug press, whereby random length rolls may be received in random spacing for finishing.

3. The counter roll finishing system according to claim 2 wherein said plug press is actuated by said manually operable switch means to seat the core plugs, and a rejector means operable upon seating of said plugs to reverse operation of the plug press and eject said roll onto said transfer conveyor means.

4. The counter roll finishing system according to claim 1 including; first contact switch means operable in response to the entry of a roll onto said transfer conveyor for wrapping said conveyor and wrapper dispenser means, said first contact switch when passed by said roll serving to actuate said cut-off mechanism, and deenergization of said wrapper dispenser being responsive to the operation of the cut-off mechanism, second contact switch means actuated by the movement of said roll to a stop position adjacent said table for deenergizing said transfer conveyor and energizing said means for discharging the roll across the wrapper table.

5. The counter roll finishing system according to claim including; means to apply adhesive material to said wrapper strip as it is dispensed, said adhesive applying means being actuated by said first contact switch means, and third contact switch means operable by passage of said roll to deenergize said adhesive applying means in advance of the energization of the wrapper cut-off mechanism.

6. The counter roll finishing system according to claim 5 wherein said wrapper cut-off mechanism is constructed and arranged to sever an individual wrapper for a roll of a measured length corresponding to the length of the roll and an additional amount sufficient for the crimping of its end portions against the roll surfaces.

7. The counter roll finishing system according to claim 6 including; first crimper means adapted to receive said wrapped roll from said table and to crimp one end portion of said wrapper, a first heading means for applying an end head on said one crimped end, means to transfer said roll from said first crimper means to said first heading means, second crimper means adapted to receive said roll from said first heading means and to crimp the other end portion of said wrapper, means to transfer said roll from said first heading means to said second crimper means, second heading means for applying an end head on the other crimped end of the roll and means to transfer said roll from the second crimper means to the second heading means.

8. A counter roll finishing system comprising in combination; infeed conveyor means for receiving and selecting advancing random length counter rolls in random spacing, plug press means for seating core plugs in opposite ends of each counter roll advanced thereto from said infeed conveyor, a wrapping table, first transfer conveyor means operable between said wrapping table and said plug press and adapted to receive a plugged roll from said press and to advance the same to a roll stop position adjacent said wrapping table, wrapper dispenser means at one end of the table for dispensing a wrapper strip at the rate of conveyor advancement of the counter roll, means to apply adhesive material to said wrapper strip as it is dispensed, a wrapper cut-off mechanism actuated by each counter roll advancement to cut off an individual wrapper strip of corresponding length, kicker means for laterally discharging the roll from the first transfer conveyor across the wrapping table causing the wrapper strip to be rolled about and secured thereto, first and second crimper means for crimping the respective end portions of said wrapper, first and second header means for applying an end head to the respective crimped ends of the wrapper, and discharge conveyor means for removing said wrapped roll from the system.

References Cited

UNITED STATES PATENTS

| | | | |
|---|---|---|---|
| 2,246,525 | 6/1941 | Matter | 53—216 X |
| 3,251,171 | 5/1966 | Lagesse | 53—66 |
| 3,296,772 | 1/1967 | Barker | 53—216 X |

TRAVIS S. McGEHEE, *Primary Examiner.*

UNITED STATES PATENT OFFICE
CERTIFICATE OF CORRECTION

Patent No. 3,380,223                                              April 30, 1968

Ronald J. Jasper et al.

It is certified that error appears in the above identified patent and that said Letters Patent are hereby corrected as shown below:

Column 6, lines 56 and 57, "rejector" should read -- ejector --; line 63, "wrapping" should read -- starting --; line 73, before "including" insert the claim reference numeral -- 4 --.

Signed and sealed this 10th day of March 1970.

(SEAL)
Attest:

Edward M. Fletcher, Jr.                        WILLIAM E. SCHUYLER, JR.
Attesting Officer                                    Commissioner of Patents